United States Patent
Copeland et al.

(10) Patent No.: US 10,465,557 B2
(45) Date of Patent: Nov. 5, 2019

(54) MAGNETIC SQUEEZE FILM DAMPER SYSTEM FOR A GAS TURBINE ENGINE

(71) Applicant: Rolls-Royce North American Technologies, Inc., Indianapolis, IN (US)

(72) Inventors: Andrew D. Copeland, Greenwood, IN (US); Donald W. Burns, Avon, IN (US); Stanford O. Clemens, Carmel, IN (US); Alan B. Cookerly, Brownsburg, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 118 days.

(21) Appl. No.: 14/841,754

(22) Filed: Sep. 1, 2015

(65) Prior Publication Data
US 2017/0058697 A1    Mar. 2, 2017

(51) Int. Cl.
*F01D 25/16* (2006.01)
*F02C 7/06* (2006.01)
*F04D 29/32* (2006.01)

(52) U.S. Cl.
CPC .............. *F01D 25/164* (2013.01); *F02C 7/06* (2013.01); *F04D 29/321* (2013.01); *F16F 2224/045* (2013.01)

(58) Field of Classification Search
CPC ........ F01D 25/164; F01D 25/16; F01D 25/18; F01D 25/183; F16F 9/535; F02C 7/06;
(Continued)

(56) References Cited

U.S. PATENT DOCUMENTS 5,058,452 A * 10/1991 El-Shafei ............... F01D 25/164
                                                          464/180
5,169,241 A * 12/1992 Singh .................... F01D 25/164
                                                          384/581
(Continued)

FOREIGN PATENT DOCUMENTS

DE  10 2010 048381 A1   4/2012
EP       2 224 103 A2   9/2010
JP       S55 112421 A   8/1980

OTHER PUBLICATIONS

Zhu, C., Robb, D.A. and Ewins, D.J., 2002. A magneto-rheological fluid squeeze film damper for rotor vibration control. In Proceeding of SPIE's 9th Annual International Symposium on Smart Structures and Materials (vol. 4753, pp. 516-522).*

(Continued)

*Primary Examiner* — Ted Kim
(74) *Attorney, Agent, or Firm* — Maginot, Moore & Beck, LLP

(57) ABSTRACT

A magnetic squeeze film damper system comprises a bearing assembly having an outer race with a first outer surface and a first inner surface and a bearing located along the first inner surface. The system further comprises a squeeze film damper housing having a second outer surface and a second inner surface that is contiguous with the first outer surface. A channel having a forward end and an aft end is defined within the housing along the second inner surface, the channel bordered by the first outer surface. The system further includes a first seal gland located along the forward end of the channel and a second seal gland located along the aft end of the channel. Both seal glands comprise a reservoir for holding a magneto-rheological fluid, the reservoir encased in an elastomer. At least one electromagnet is arranged in close proximity to each of the seal glands.

20 Claims, 4 Drawing Sheets

(58) Field of Classification Search
CPC ............. F05D 2240/50; F05D 2240/51; F05D 2260/96; F05D 2260/98
See application file for complete search history.

(56) References Cited

U.S. PATENT DOCUMENTS

| | | | | |
|---|---|---|---|---|
| 5,251,985 | A * | 10/1993 | Monzel | ..................... F16F 1/32 |
| | | | | 384/99 |
| 5,256,952 | A | 10/1993 | Yoneyama et al. | |
| 5,452,957 | A | 9/1995 | Duggan | |
| 5,660,397 | A | 8/1997 | Holtkamp | |
| 5,749,700 | A | 5/1998 | Henry et al. | |
| 5,829,319 | A | 11/1998 | Mokeddem | |
| 5,969,451 | A | 10/1999 | Lyons et al. | |
| 5,977,677 | A * | 11/1999 | Henry | ................... F01D 25/164 |
| | | | | 310/90.5 |
| 6,159,241 | A * | 12/2000 | Lee | ........................ A61F 2/147 |
| | | | | 623/5.11 |
| 6,345,552 | B1 | 2/2002 | Röhrig et al. | |
| 6,623,364 | B2 | 9/2003 | Badolato et al. | |
| 6,637,558 | B2 | 10/2003 | Oliver et al. | |
| 6,960,024 | B2 | 11/2005 | Robb et al. | |
| 8,042,659 | B1 * | 10/2011 | Welsh | ................... F16F 15/366 |
| | | | | 188/267.2 |
| 8,143,772 | B2 | 3/2012 | Francesconi | |
| 8,465,207 | B2 | 6/2013 | Maier et al. | |
| 8,531,071 | B2 | 9/2013 | Klusman | |
| 8,702,377 | B2 | 4/2014 | Cottrell et al. | |
| 2004/0146337 | A1 | 7/2004 | Zuge et al. | |
| 2011/0064340 | A1* | 3/2011 | Duong | .................. F16C 27/045 |
| | | | | 384/99 |
| 2015/0300406 | A1* | 10/2015 | Freeman | ............. F16F 15/0237 |
| | | | | 416/174 |
| 2016/0377143 | A1* | 12/2016 | O'Connor | ............... F16F 9/535 |
| | | | | 29/559 |

OTHER PUBLICATIONS

European Search Report corresponding to application No. 16181179.9 dated Mar. 27, 2017 ( 8 pages).

* cited by examiner

MAGNETIC SQUEEZE FILM DAMPER SYSTEM FOR A GAS TURBINE ENGINE

BACKGROUND

The present disclosure relates to devices and systems to address stability and vibration issues associated with high-speed rotating turbomachinery. More particularly, the present disclosure relates to devices and systems for addressing stability and vibration issues associated with gas turbine engines used in aircrafts, for example.

In gas turbine engines, maintaining operational clearances between the tips of rotating blades and the engine static structure and controlling vibration generated by the high speed rotating components are design critical factors in gas turbine engine development. Maintaining operational clearances between the tips of rotating blades and the static structure of the engine to reduce air leakage past the rotating blades impacts the thermodynamic efficiency and specific fuel consumption (SFC) of the engine.

Further, gas turbine engine shaft dynamics are critical, including the placement of shaft critical speed in the optimal frequency range and the rotor response to imbalance and transient excursions through critical speeds. The critical speed is usually controlled by adjusting the stiffness/flexibility of various components of the gas turbine engine, such as, for example, the shaft or shafts, the bearings, and the support structures. Moreover, rotating shafts in gas turbine engines can become abnormally unbalanced while operating. For example, a high pressure turbine shaft can become abnormally unbalanced after a turbine blade failure.

Shaft response to imbalance and transient critical speed operation (i.e., vibration response) are controlled via damping. In gas turbine engines, damping and stiffness control are typically achieved using hydraulic devices such as squeeze film dampers (SFD). In a gas turbine engine, the SFDs work in conjunction with and are typically contiguous with the various bearing systems that support the rotating shafts of the engine. A squeeze film damper achieves both stiffness and damping by virtue of the whirl motion of the shaft acting on the oil filled annulus (cavity) of the SFD.

However, both the stiffness and the damping coefficient achieved by typical SFDs are non-linear with respect to the orbital displacement of the shaft. Also, the stiffness and damping coefficients are linked such that a modification to one impacts the other. Because current SFD systems do not provide for variable control during operation, they are not able to precisely locate and control response to critical speeds, since stiffness and damping are varied along with whirl displacement. Thus, a SFD/bearing assembly is designed to cover the widest range of operating conditions for a particular engine.

A SFD that offers varied control would provide improved rotor tip clearance control during maneuver loading situations by limiting how far the bearing can move radially. Further, varied control damping will help keep tip clearances tight and reduce air leakage past the rotor blades resulting in improved specific fuel consumption. There remains a need to improve sealing of the SFD cavity to improve the reliability and consistency of the damping characteristics of the SFD system.

SUMMARY OF INVENTION

The magnetic squeeze film damper system of the present disclosure comprises a bearing assembly having an outer race with a first outer surface and a first inner surface. The bearing assembly includes a bearing located along the first inner surface. The magnetic squeeze film damper system of the present disclosure further comprises a squeeze film damper housing, which includes a second outer surface and a second inner surface. The second inner surface of the housing is contiguous with the first outer surface of the bearing outer race. A channel for flowing a fluid is defined within the housing along the second inner surface, the channel bordered by the first outer surface of the bearing outer race. The channel further includes a forward end and an aft end.

The magnetic squeeze film damper system of the present disclosure further includes a first seal gland located along the forward end of the channel and a second seal gland located along the aft end of the channel. The first seal gland seals the forward end of the channel and the second seal gland seals the aft end of the channel. The first seal gland comprises a reservoir encased by an elastomer. The reservoir contains a fluid having suspended metal particles, such as a magneto-rheological fluid. The second seal gland also comprises a reservoir constructed to contain a magneto-rheological fluid. At least one electromagnet is arranged in close proximity to each of the seal glands. The magnetic squeeze film damper system of the present disclosure also includes an electronic control system, which may include a current generator and various sensors to generate varied current to energize the electromagnets.

DETAILED DESCRIPTION

Figure 1:
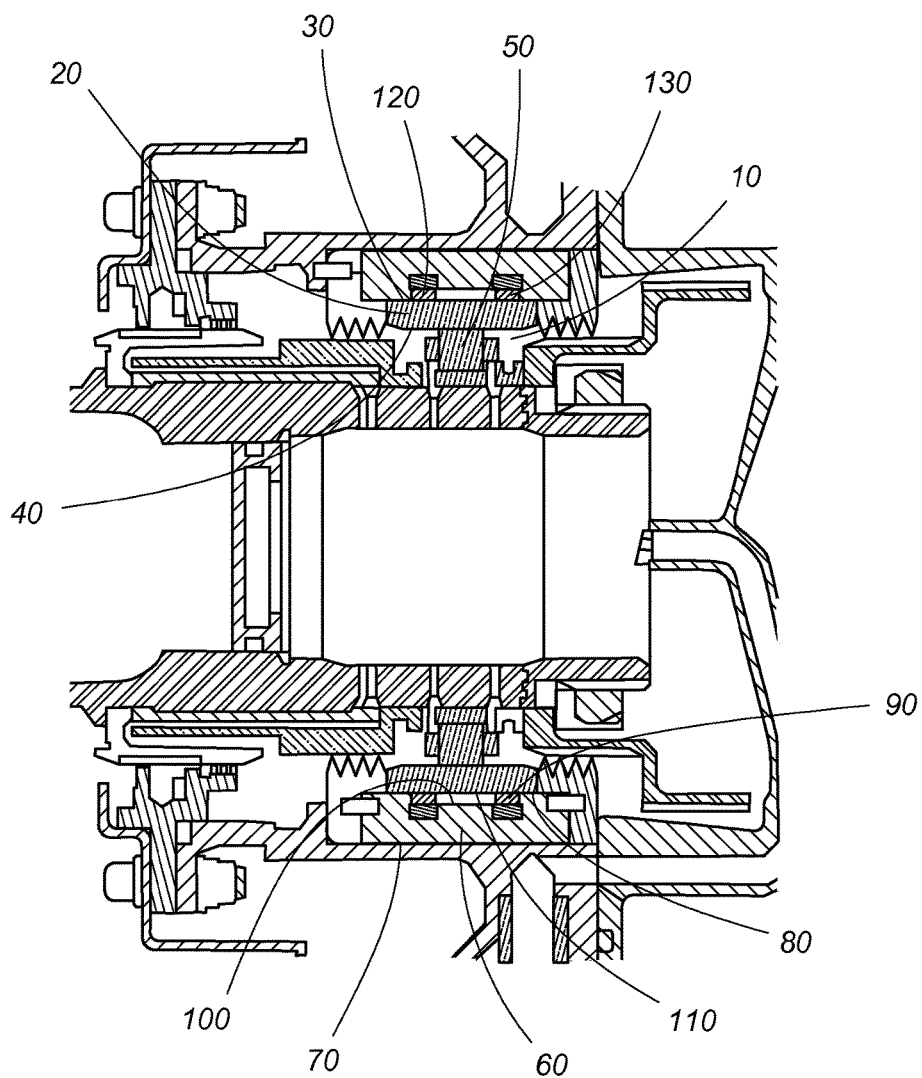
FIG. 1 is a cross section of one aspect of the present disclosure showing a magnetic squeeze film damper/bearing assembly supporting a shaft of a gas turbine engine.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles disclosed herein as would normally occur to one skilled in the art to which this disclosure pertains.

Figure 2:
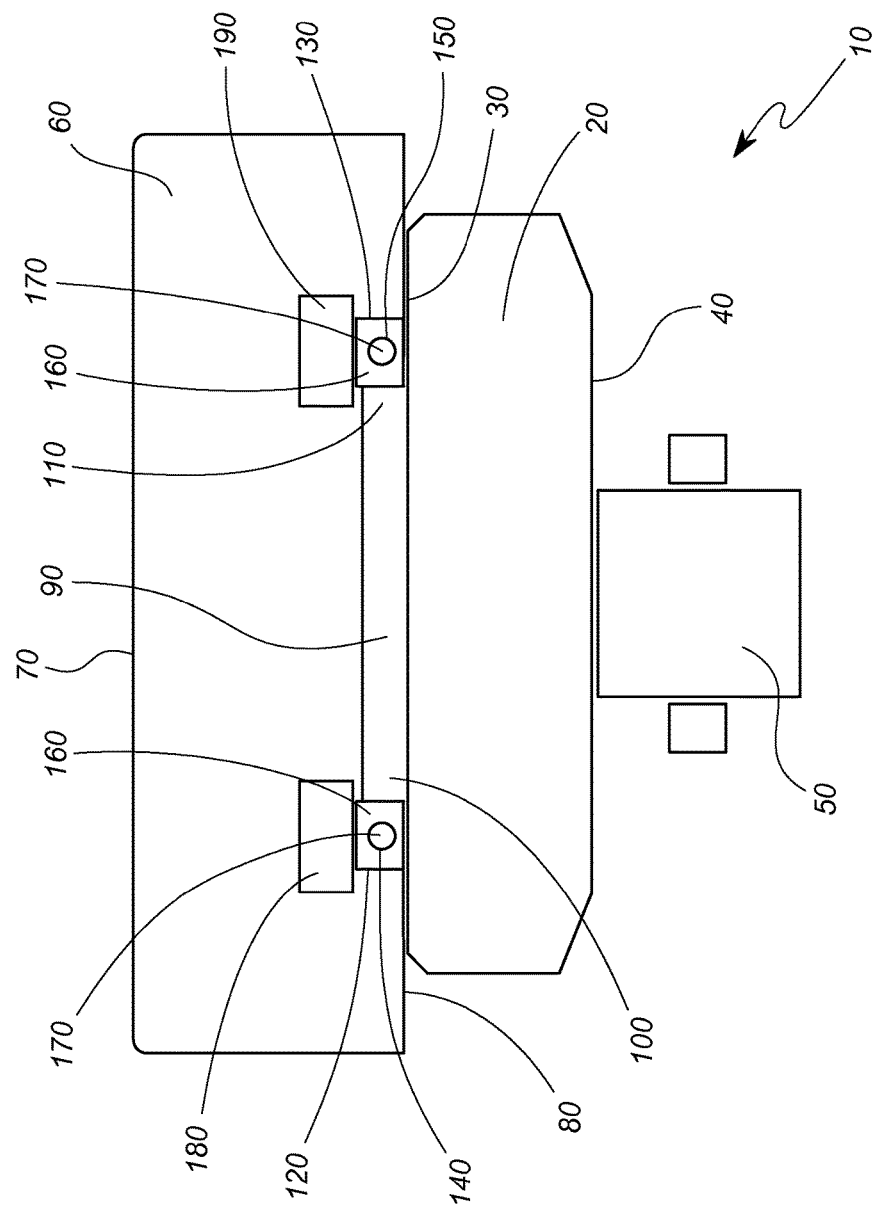
FIG. 2 is an enlarged cross section of the relevant structure of the magnetic squeeze film damper/bearing assembly of FIG. 1.

Referring to FIG. 1 and FIG. 2, a non-limiting embodiment of the present invention is depicted. One embodiment of the present invention includes a bearing assembly 10 having an outer race 20. The outer race 20 includes a first outer surface 30 and a first inner surface 40. The bearing assembly includes at least one bearing 50 located along the first inner surface 40. The at least one bearing can be any type of bearing suitable for use in a gas turbine engine to support a rotatable shaft of the engine. Such bearings can include roller bearings or ball bearings for radial load and thrust load applications or any other bearing configuration suitable, as would be understood by one of ordinary skill in the art.

The embodiment further includes a squeeze film damper housing 60. The housing 60 includes a second outer surface 70 and a second inner surface 80. The second inner surface 80 of the housing 60 is contiguous with the first outer surface 30 of bearing outer race 20. An annular channel 90 for flowing a fluid is defined within the housing 60 along second inner surface 80, the channel 90 bordered by the first outer surface 30 of bearing outer race 20. Channel 90 further includes a forward end 100 and an aft end 110.

As best seen in FIG. 2, the magnetic squeeze film damper system of the present embodiment further includes a first seal gland 120 located along the forward end 100 of channel 90. The first seal gland 120 seals the forward end 100 of channel 90. The present embodiment also includes a second seal gland 130 located along the aft end 110 of channel 90. The second seal gland 130 seals the aft end 110 of channel 90. The squeeze film damper system, as thus far described, is configured, as conventional in the art, to provide fluid flow in the channel 90 between the static structure and the shaft bearing assembly 10.

In one aspect of the present disclosure, the first seal gland 120 comprises a reservoir 140 encased by an elastomer 160. The selection of the elastomer will be apparent to one of ordinary skill based on the particular conditions that the elastomer will be subjected to for a particular engine. Such particular conditions include, for example, the temperature range that the elastomer will experience.

The reservoir 140 contains a fluid having suspended metal particles, such as a magneto-rheological fluid 170. The second seal gland 130 also comprises a reservoir 150 encased by an elastomer 160. The reservoir 150 also contains a fluid 170 with suspended metal particles, such as a magneto-rheological fluid. The seal glands' reservoirs 140/150, with the suspended metal particles, are completely sealed. Further, the seal glands will have a characteristic stiffness as a result of the particular elastomer used and the magneto-rheological fluid within the sealed reservoirs.

The present embodiment includes an electromagnet 180 arranged in close proximity to the first seal gland 120. A single electromagnet or multiple electromagnets fall within the scope of the present invention, with the appropriate number determined based on the requirements of the specific engine environment as would be understood by one of ordinary skill. Similarly, a second electromagnet 190 (or electromagnets) is arranged in close proximity to the second seal gland 130.

Once energized, the electromagnets generate a magnetic field that varies according to the varied current used to energize the electromagnets. The magnetic field generated by the energized electromagnets affects the suspended metal particles in the magneto-rheological fluid thereby altering the viscosity of the magneto-rheological fluid. Altering the viscosity of the magneto-rheological fluid changes the stiffness of the seal glands and the stiffness of the overall SFD system in proportion to the strength of the magnetic field. Thus, varying the strength of the magnetic field achieves controlled variable damping of shaft vibration or damping shaft axial and/or radial movement to acceptable levels. Such varied control is not currently feasible with standard SFD systems.

Figure 3:
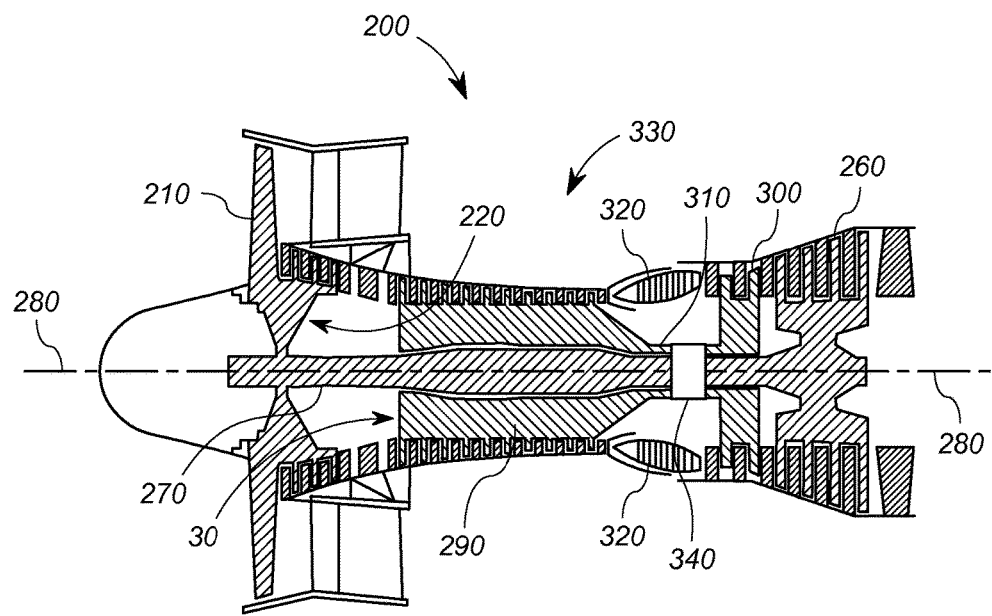
FIG. 3 is a cross section of a two spool gas turbine engine incorporating the bearing assembly of FIGS. 1-2.

The magnetic squeeze film damper is suitable for use with any configuration of gas turbine engine, including single shaft and multiple shaft versions. Referring now to FIG. 3, a cross section of a twin spool (two shaft) turbofan gas turbine engine 200 is shown. Gas turbine engine 200 comprises a low pressure spool and a high pressure spool. The low pressure spool includes fan 210, which is the first stage of low pressure compressor 220 and a low pressure turbine 260. The low pressure compressor 220 is connected to the low pressure turbine 260 by an inner shaft 270, which rotates about a centerline 280 of gas turbine engine 200.

The high pressure spool is located between the low pressure compressor 220 and the low pressure turbine 260. It includes a high pressure compressor 290 connected to a high pressure turbine 300 by outer shaft 310. Outer shaft 310 also rotates about centerline 280, but rotates independently from inner shaft 270. Combustors 320 are located between high pressure compressor 290 and high pressure turbine 300. The high pressure compressor 290, combustors 320 and high pressure turbine 300 make up the engine core 330 of gas turbine engine 200. The magnetic squeeze film damper system of the present invention can be located at any point along the shafts 270/310 of gas turbine engine 200 where bearings are located to support said shafts. Location 340 in FIG. 3 is but one example of a suitable location for a magnetic squeeze film damper system.

Figure 4:
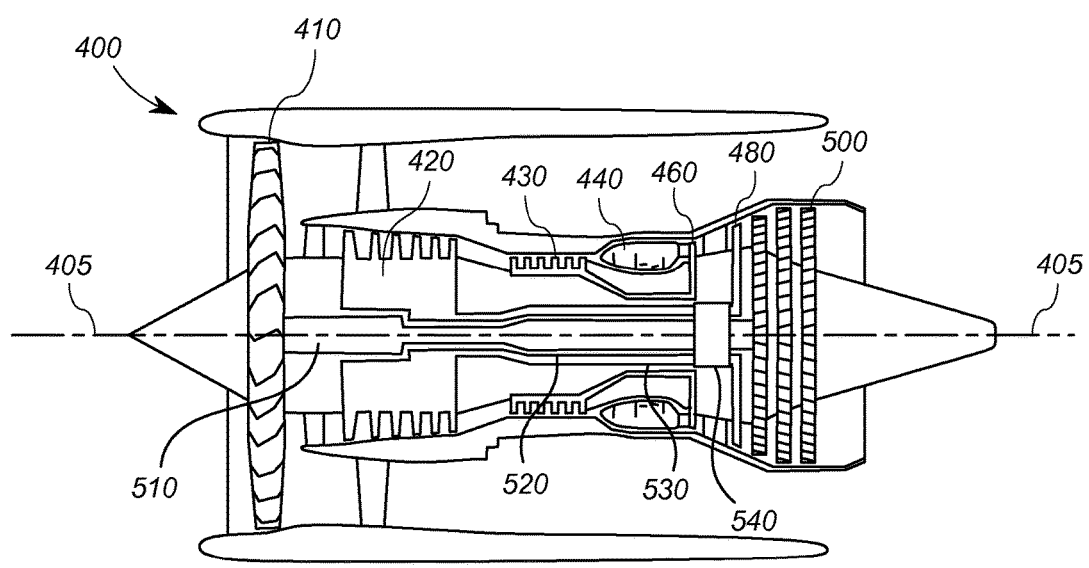
FIG. 4 is a cross section of a three spool gas turbine engine incorporating the bearing assembly of FIGS. 1-2.

Referring now to FIG. 4, a three spool (three shaft) gas turbine engine is shown as another configuration of gas turbine engine where the magnetic squeeze film damper system may be used. Gas turbine engine 400 includes fan 410 connected to low pressure turbine 500 by inner shaft 510. Inner shaft 510 rotates about engine centerline 405. The fan 410, low pressure turbine 500 and inner shaft 510 comprise the low pressure spool.

The intermediate spool is located between the fan 410 and the low pressure turbine 500. It includes intermediate pressure compressor 420 and intermediate pressure turbine 480, which are connected by intermediate shaft 520. Intermediate shaft 520 is rotatable about centerline 405 and rotates independently from inner shaft 510.

The high pressure spool is located between the intermediate pressure compressor 420 and the intermediate pressure turbine 480. It includes the high pressure compressor 430 and the high pressure turbine 460. The high pressure compressor 430 is connected to the high pressure turbine 460 by outer shaft 530. Outer shaft 530 is rotatable about centerline 405 and is independent of inner shaft 510 and intermediate shaft 520. Combustors 440 are located between the high pressure compressor 430 and the high pressure turbine 460.

The magnetic squeeze film damper system of the present invention can be located at any point along the coaxial shafts 510/520/530 of gas turbine engine 400 where bearings are located to support said shafts. Location 540 in FIG. 4 is but one example of a suitable location for a magnetic squeeze film damper system for the three spool gas turbine engine 400.

Figure 5:
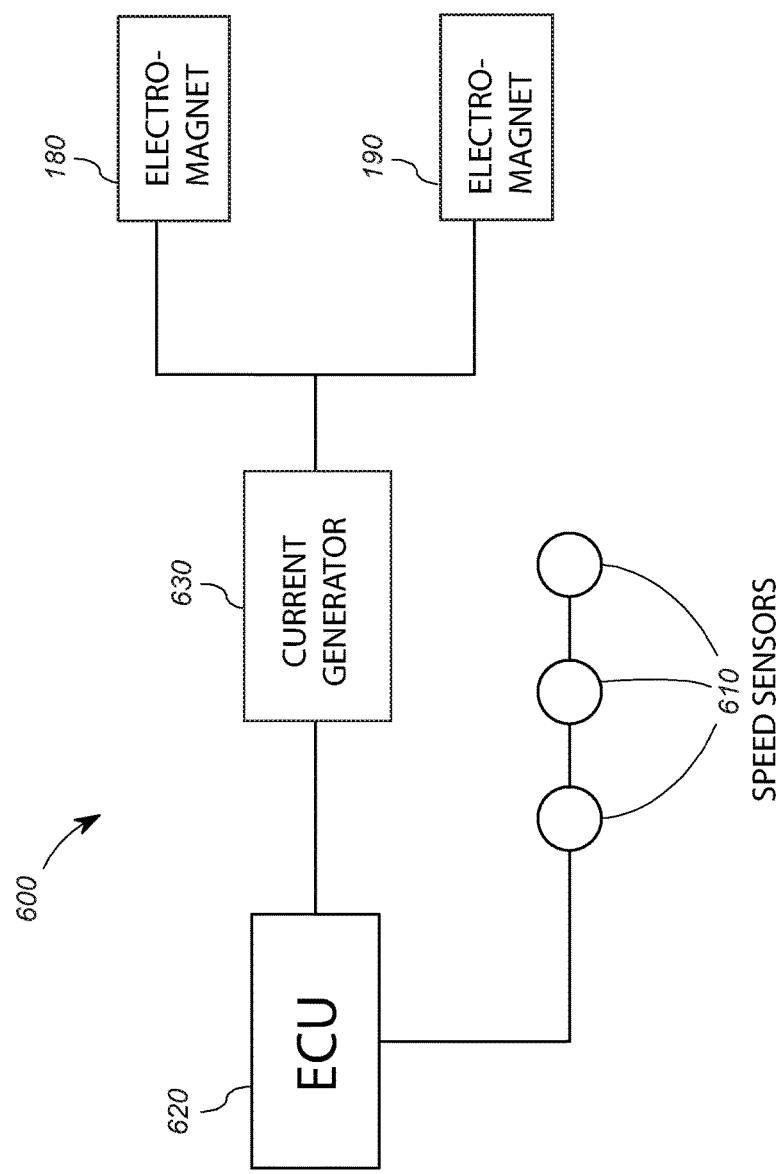
FIG. 5 is a diagram of one aspect of the present disclosure showing one embodiment of an electronic control system of the magnetic squeeze film damper.

An electronic control system, which may include a current generator and various sensors, is provided to generate varied current to energize the electromagnets and produce a varied magnetic field in proportion to the current. Referring now to FIG. 5, one potential embodiment of a control system 600 may include one or more speed sensors 610 connected to an electronic control unit (ECU) 620. The ECU 620 is also connected to and controls the output of a current generator 630. The current generator is connected to the at least one electromagnets 180/190. The electronic control system 600 also includes power source (not shown).

In operation, the ECU 620 monitors the one or more speed sensor(s) 610. As the engine shaft reaches known modes of a super critical shaft speed, the ECU 620 receives a corresponding signal from the one or more speed sensor(s) and sends a corresponding command to the current generator 630. In response to the command of the ECU 620, current generator 630 generates the appropriate current to energize the at least one electromagnet 180/190 to produce the electromagnetic field strength necessary to effect the appropriate viscosity change in the magneto-rheological fluid to alter the stiffness of the seal glands, thus providing the required damping as the shaft passes through a super critical mode.

In another embodiment, the control system may also include a g-force type sensor to monitor the g-forces experienced by the aircraft. When the aircraft is subjected to extreme g-forces, such as when the aircraft is in a high g-force maneuver, the high g-forces could push the turbine rotor off center. In this embodiment, the ECU would recognize when the aircraft was in a high g-force maneuver via a signal from the one or more g-force sensors. The ECU will send a corresponding command to the current generator to generate the appropriate current to energize the at least one electromagnet to produce the appropriate magnetic field to adjust the viscosity of the magneto-rheological fluid to increase the bearing system stiffness; thereby, limiting radial displacement of the turbine rotor attached to the shaft system.

Note, the scope of the control system is not limited by the examples set forth herein. One of ordinary skill in the art would understand that many variations of a control system are suitable and would depend on the particular application of the invention to a particular engine configuration. For example, the scope of the present disclosure includes control systems utilizing more than one type of sensor for any particular application as would be understood by one of ordinary skill. Sensors, such as speed sensors, g-force sensors and gap measuring sensors can be used individually or in combination as appropriate.

In operation, the magnetic squeeze film damper system provides variable controlled damping that supplements the damping capabilities of the SFD alone. This supplementation will most notably occur during transient operating conditions, such as operating through shaft critical speeds. Moreover, the additional damping capabilities of the magnetic squeeze film damper provide additional controlled variable damping during conditions of excessive levels of steady state synchronous vibration.

It should be understood that relative positional terms such as "aft" and "forward" and the like are with reference to the normal operational attitude of the vehicle in which the gas turbine engine is installed and should not be considered otherwise limiting.

The present invention has been described in an illustrative manner. It is to be understood that the terminology that has been employed herein is intended to be in the nature of words of description rather than word of limitation. While there have been described herein, what are considered to be preferred and exemplary embodiments of the present invention, other modifications of the invention shall be apparent to those skilled in the art from the teachings herein and, it is, therefore, desired to be secured in the appended claims all such modification as fall within the true spirit and scope of the invention.

We claim:

1. A magnetic squeeze film damper system comprising:
a bearing assembly having an outer race with a first outer surface and a first inner surface;
at least one bearing located along the first inner surface;
a squeeze film damper housing having a second outer surface and a second inner surface, the second inner surface contiguous with the first outer surface;
a channel for flowing a fluid, the channel defined within the squeeze film damper housing at the second inner surface between the squeeze film damper housing and the first outer surface of the outer race, the channel recessed within the second inner surface and having a forward end and an aft end between contiguous portions of the second inner surface and first outer surface;
a first seal gland recessed within the second inner surface and disposed between the squeeze film damper housing and the outer race for sealing the channel forward end and a second seal gland recessed within the second inner surface and disposed between the squeeze film damper housing and the outer race for sealing the channel aft end;
the first seal gland comprising a reservoir surrounded by an elastomer, the reservoir containing a magneto-rheological fluid; and
an electromagnet arranged in close proximity to the first seal gland, whereby when the electromagnet is energized the viscosity of the rheological fluid is varied such that the stiffness of the first seal gland is altered.

2. The magnetic squeeze film damper system of claim 1 wherein the fluid is engine oil.

3. The magnetic squeeze film damper system of claim 1 further comprising a second seal gland having a reservoir surrounded by an elastomer, the reservoir containing a magneto-rheological fluid and a second electromagnet arranged in close proximity to the second seal gland whereby when the second electromagnet is energized the viscosity of the rheological fluid is varied such that stiffness of the second seal gland is altered.

4. The magnetic squeeze film damper system of claim 3 further comprising an electronic control system operable to provide a variable current to the electromagnet such that the viscosity of the magneto-rheological fluid is altered as a function of the variable current.

5. The magnetic squeeze film damper system of claim 4 wherein the electronic control system includes at least one sensor for sensing speed of a rotating shaft.

6. The magnetic squeeze film damper system of claim 1 wherein the at least one bearing comprises at least one roller bearing.

7. The magnetic squeeze film damper system of claim 1 wherein the at least one bearing comprises at least one thrust bearing.

8. A gas turbine engine comprising:
a low pressure compressor;
an engine core located aft of the low pressure compressor;
a low pressure turbine located aft of the engine core;
at least one shaft rotatable around a centerline of the engine core;
at least one bearing assembly mounted to support the at least one shaft;
the bearing assembly comprising an outer race with a first outer surface and a first inner surface;
at least one bearing located along the first inner surface;
a squeeze film damper housing having a second outer surface and a second inner surface, the second inner surface contiguous with the first outer surface;
a channel for flowing a fluid, the channel defined within the squeeze film damper housing along the second inner surface and bordered by the first outer surface, the channel recessed within the second inner surface and having a forward end and an aft end between contiguous portions of the second inner surface and first outer surface;

a first seal gland recessed within the second inner surface for sealing the channel forward end and a second seal gland recessed within the second inner surface for sealing the channel aft end;

the first seal gland and the second seal gland each comprising a reservoir surrounded by an elastomer, the reservoir containing a magneto-rheological fluid; and an electromagnet arranged in close proximity to the first seal gland, whereby when the electromagnet is energized the viscosity of the rheological fluid is varied such that the stiffness of the first seal gland is altered.

9. The gas turbine engine of claim 8 wherein the fluid is engine oil.

10. The gas turbine engine of claim 8 further comprising an electronic control system operable to provide a variable current to the electromagnet such that the viscosity of the magneto-rheological fluid is altered as a function of the variable current.

11. The gas turbine engine of claim 10 wherein a second electromagnet is arranged in close proximity to the second seal gland, and wherein the electronic control provides a current to the second electromagnet for altering the viscosity of the magneto-rheological fluid in the second seal gland.

12. The gas turbine engine of claim 11 wherein the electronic control system includes at least one sensor for sensing speed of the shaft.

13. The gas turbine engine of claim 8 wherein the at least one bearing is at least one roller bearing.

14. The gas turbine engine of claim 8 wherein the at least one bearing is at least one ball bearing.

15. An improved vibration damper system in combination with a gas turbine engine, the combination comprising:

a gas turbine engine comprising and engine case surrounding a low pressure compressor, an engine core and a low pressure turbine, at least one shaft rotatable around a centerline of the engine core and at least one bearing assembly for supporting the at least one shaft; and a magnetic squeeze film damper system arranged in close proximity to the at least one bearing assembly, the magnetic squeeze film damper system comprising a housing, an annular channel for enclosing flowing engine oil, the annular channel defined within the housing along an inner surface of the housing and bordered by an outer race of the at least one bearing assembly, the annular channel recessed within the inner surface of the housing and further comprising a forward end and an aft end between contiguous portions of the inner surface and the outer race, the magnetic squeeze film damper further comprising a first seal gland and a second seal gland each recessed within the inner surface of the housing, the first and second seal gland each comprising a reservoir surrounded by an elastomer, the reservoir containing a magneto-rheological fluid, the first seal gland forming a seal for the forward end and the second seal gland forming a seal for the aft end, an electromagnet arranged in close proximity to the first seal gland and an electromagnet arranged in close proximity to the second seal gland.

16. The combination of claim 15 wherein the magnetic squeeze film damper system further includes an electronic control system for supplying current to the electromagnets such that when the current is varied the stiffness of the seal glands are altered in proportion to the strength of the current.

17. The combination of claim 16 wherein the electronic control system further includes an electronic control unit connected to a current generator and to at least one sensor, the current generator further connected to the electromagnets wherein a signal from the at least one sensor prompts the electronic control unit to command the current generator to send a current to the electromagnets to produce a magnetic field proportional to the current.

18. The combination of claim 17 wherein the at least one sensor is selected from a group of sensors comprising a speed sensor, a g-force sensor and a gap measuring sensor.

19. The combination of claim 15 wherein the at least one bearing comprises a roller bearing.

20. The combination of claim 15 wherein the at least one bearing comprises a ball bearing.

* * * * *